(12) United States Patent
Choi

(10) Patent No.: US 7,891,709 B2
(45) Date of Patent: Feb. 22, 2011

(54) SEALING MEMBER FOR EXHAUST PIPE OF DRYER

(75) Inventor: Kang Mo Choi, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 12/440,153

(22) PCT Filed: Sep. 6, 2007

(86) PCT No.: PCT/KR2007/004297

§ 371 (c)(1),
(2), (4) Date: Mar. 5, 2009

(87) PCT Pub. No.: WO2008/030042

PCT Pub. Date: Mar. 13, 2008

(65) Prior Publication Data

US 2010/0187772 A1    Jul. 29, 2010

(30) Foreign Application Priority Data

Sep. 6, 2006 (KR) ...................... 10-2006-0085799
Sep. 6, 2006 (KR) ...................... 10-2006-0085801

(51) Int. Cl.
*F16L 41/00* (2006.01)
(52) U.S. Cl. ........................... 285/215; 34/140; 34/235; 277/606
(58) Field of Classification Search .............. 285/140.1, 285/139.2, 213, 215, 424, 371; 34/140, 235; 277/606, 607
See application file for complete search history.

(56) References Cited

U.S. PATENT DOCUMENTS

| 2,897,533 | A | * | 8/1959 | Bull et al. ..................... 277/606 |
| 4,302,035 | A | * | 11/1981 | Ochwat ...................... 285/215 |
| 4,365,829 | A | * | 12/1982 | Fowler .................... 285/140.1 |
| 4,738,310 | A | * | 4/1988 | Luttenberger et al. .... 285/140.1 |
| 4,941,693 | A | * | 7/1990 | Spaude et al. ............... 285/424 |
| 4,959,509 | A | * | 9/1990 | Takeuchi et al. ........... 277/606 |
| 5,165,251 | A | | 11/1992 | Tsukamoto et al. |
| 5,213,374 | A | * | 5/1993 | Keating ..................... 285/404 |
| 5,328,213 | A | * | 7/1994 | Barth ......................... 285/424 |
| 6,457,725 | B1 | * | 10/2002 | Jones ......................... 277/606 |
| 6,640,461 | B1 | | 11/2003 | Berger |
| 7,347,224 | B2 | * | 3/2008 | Nohara et al. ............... 285/424 |
| 7,434,814 | B2 | * | 10/2008 | Kumakura et al. .......... 277/606 |
| 2006/0162179 | A1 | | 7/2006 | Kong |

FOREIGN PATENT DOCUMENTS

FR    1 113 685 A    4/1956

\* cited by examiner

*Primary Examiner*—David E Bochna
(74) *Attorney, Agent, or Firm*—Birch, Stewart, Kolasch & Birch, LLP

(57) ABSTRACT

A sealing member of an exhaust pipe of a dryer prevents vibration of the exhaust pipe secured to an opening in a sheet of glass or a wall from transmission, and prevents exhaust gas from leaking from connection portions of a plurality of exhaust pipes.

12 Claims, 5 Drawing Sheets

[Fig. 1]
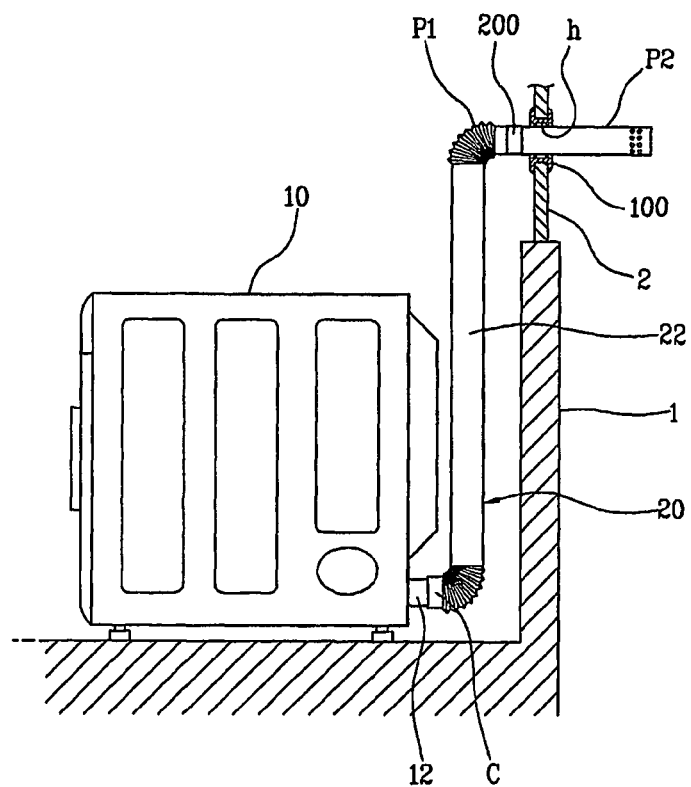
[Fig. 2]
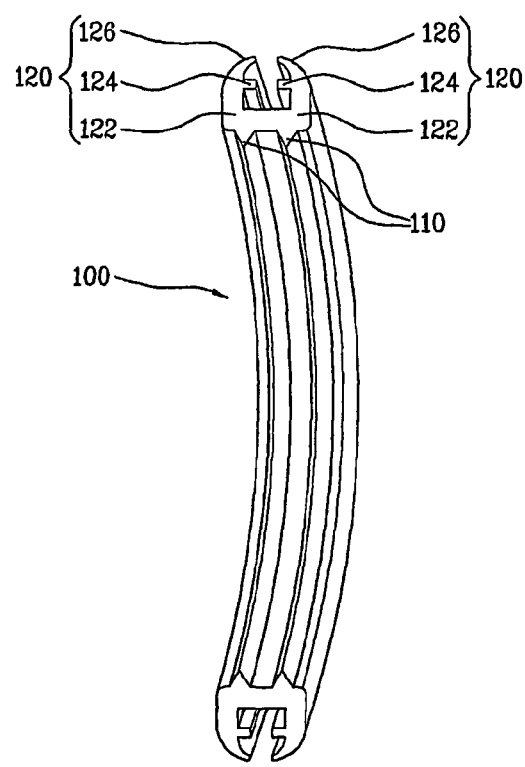

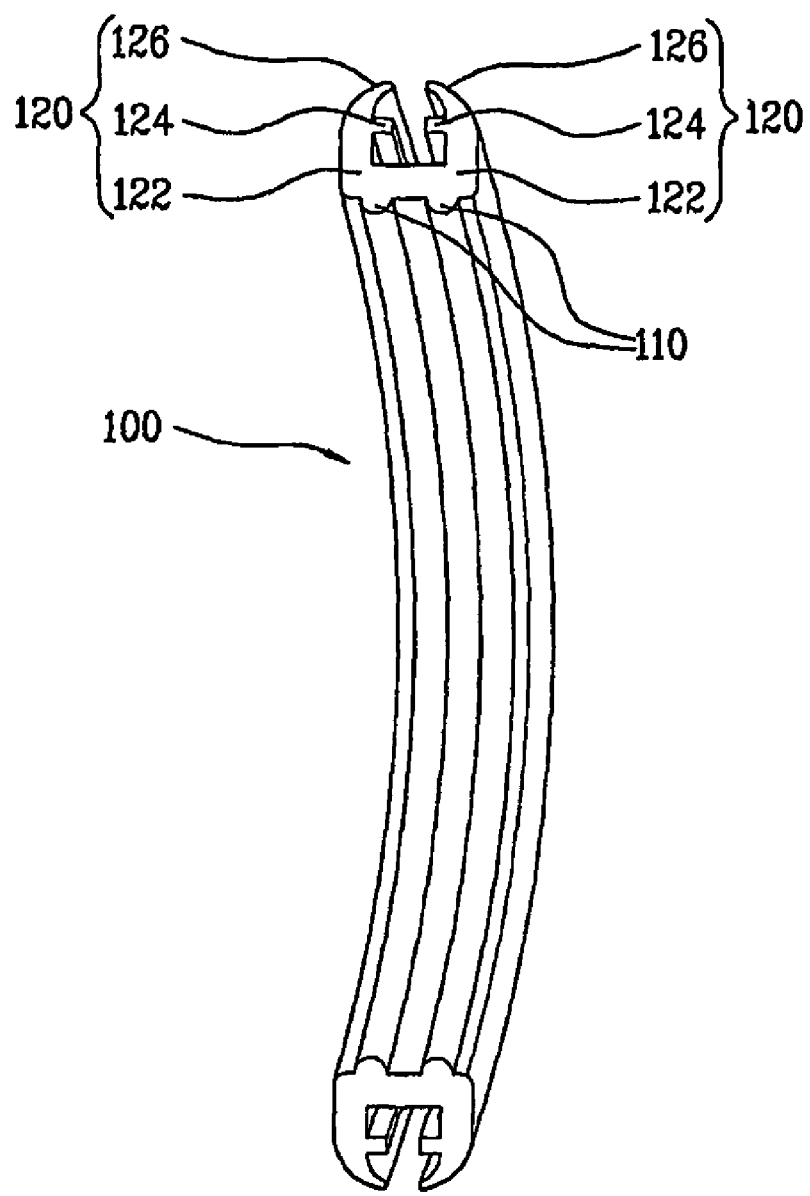
[Fig. 3]

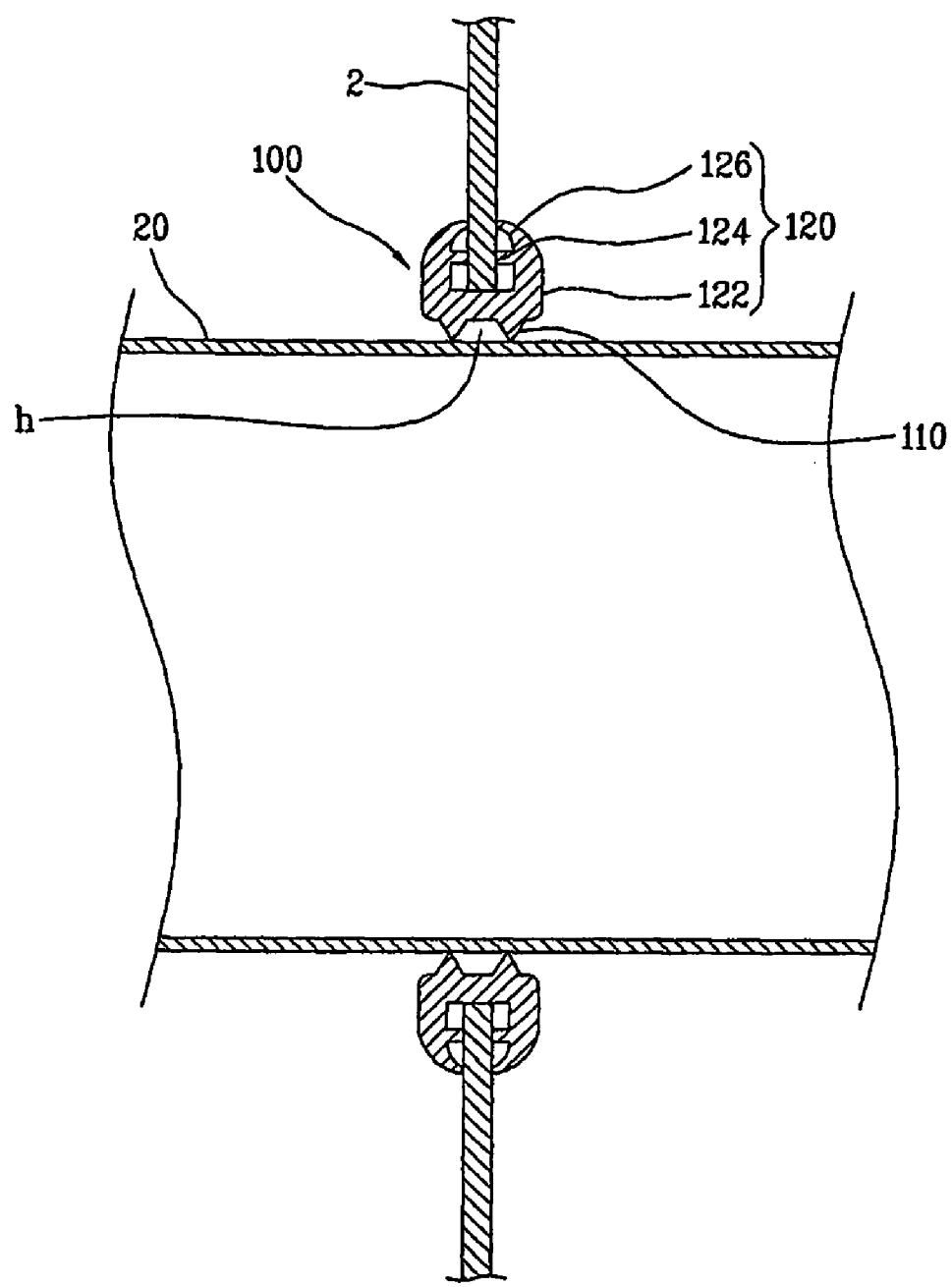
[Fig. 4]

[Fig. 5]
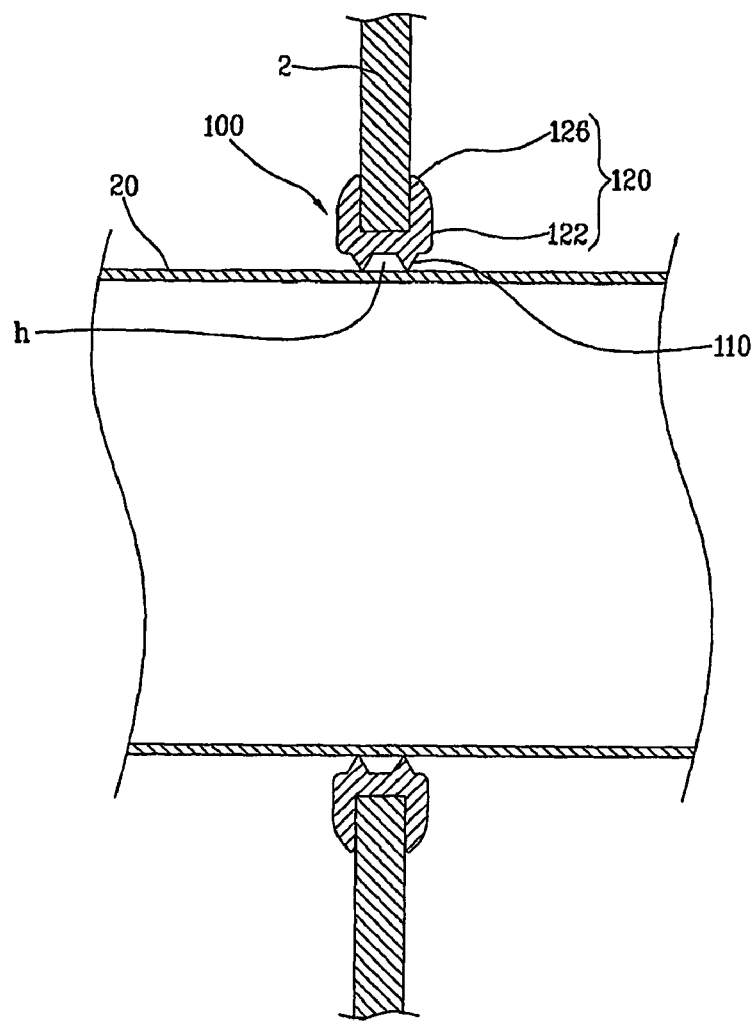
[Fig. 6]
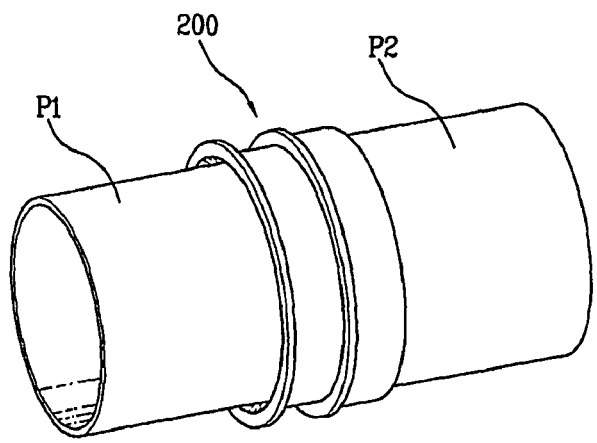

[Fig. 7]
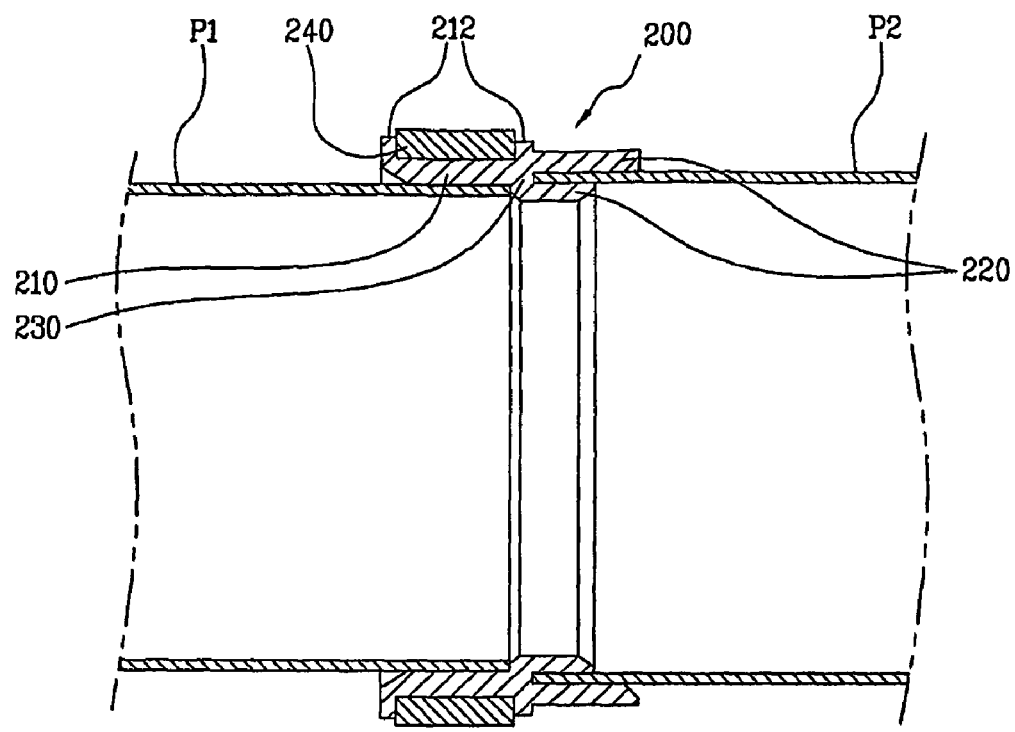
[Fig. 8]
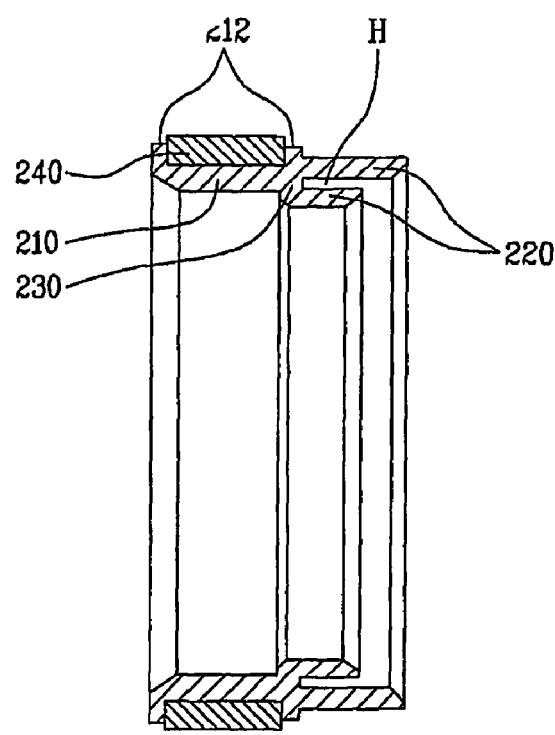

SEALING MEMBER FOR EXHAUST PIPE OF DRYER

TECHNICAL FIELD

The present invention relates to a sealing member of an exhaust pipe of a dryer which is connected to a dryer for preventing vibration of the exhaust pipe secured to an opening in a sheet of glass or a wall from transmission, and preventing exhaust gas from leaking from connection portions of a plurality of exhaust pipes.

BACKGROUND ART

In general, the dryer blows hot air from a heater into a drum to evaporate moisture from the drying object to dry the drying object. In the dryers, there are exhaust type dryers, and condensing type dryers depending on types of processing of moisture evaporated from the drying object.

The exhaust type dryer draws external air, heats the air with the heater to generate hot air, dries the drying object with the hot air, discharges humid air from the drying object to an outside of the dryer. The condensing type dryer condenses the humid air from the drying object, heats the air, and dries the drying object with the heated air, thereby circulating the air.

Of the dryers, the exhaust type dryer is in general provided with a dryer body having an exhaust duct on a rear side, and an exhaust pipe connected to the exhaust duct for guiding exhaust gas to an outside of a room.

The exhaust pipe has a first exhaust pipe connected to the exhaust duct, and a second exhaust pipe having one side connected to the first exhaust pipe and the other side extended to the outside of the room.

In order to extend the second exhaust pipe to the outside of the room, an opening is formed in a wall of a building, or a sheet of glass. In this instance, in general, the second exhaust pipe is fastened to the opening with silicone adhesive or paper or sponge placed between the second exhaust pipe and the opening.

DISCLOSURE OF INVENTION

Technical Problem

However, the general dryer exhaust pipe fastening structure, not only appears poor because the second exhaust pipe is fastened to the opening with paper or sponge placed between the second exhaust pipe and the opening, but also has a possibility of water leakage between the second exhaust pipe and the opening.

Moreover, vibration transmits from the dryer in operation to the exhaust pipe to make the exhaust pipe vibrate, to damage the exhaust pipe or the opening, or generate noise, as the exhaust pipe hits the opening at the time of vibration of the exhaust pipe.

As described, the exhaust pipe has the first exhaust pipe and the second exhaust pipe connected together. The first exhaust pipe connected to the dryer is fastened to the exhaust duct with a clamp or the like, and the second exhaust pipe connected to the first exhaust pipe is fastened with an aluminum tape or the like.

However, close contact of the clamp of metal to the exhaust pipes of metal is difficult. The aluminum tape also is liable to fall off the exhaust gas pipe due to heat from the hot exhaust gas when the aluminum tape is used for a long time, causing leakage of exhaust gas from the connection portions of the exhaust pipes.

Technical Solution

To solve the problems, an object of the present invention is to provide a sealing member of an exhaust pipe of a dryer which enables easy fastening of the exhaust pipe of the dryer to an opening in a sheet of glass or a wall, and sealing between the exhaust pipe and the opening.

Another object of the present invention is to provide a sealing member of an exhaust pipe of a dryer which can prevent vibration from transmission from an exhaust pipe to the sheet of glass of a wall having an opening formed therein.

Another object of the present invention is to provide a sealing member of an exhaust pipe of a dryer which can connect a plurality of exhaust pipes firmly such that there is no leakage of exhaust gas from the exhaust pipe.

To achieve these objects and other advantages and in accordance with the purpose of the invention, as embodied and broadly described herein, a sealing member of an exhaust pipe of a dryer includes a first sealing member for securing the exhaust pipe to an opening in a glass sheet or a wall, the first sealing member inducing a first projection portion supported on an outside circumferential surface of the exhaust pipe for preventing vibration from transmitting from the exhaust pipe, and the exhaust pipe being connected to the dryer for discharging gas from the dryer which dries a drying object to an outside of a room.

The first sealing member further includes a second projection portion formed to surround an edge of the glass sheet or the wall in which the opening is formed.

The first projection portion includes at least two projections formed along an inside circumferential surface of the first sealing member with a predetermined gap therebetween in a thickness direction of the opening, and it is preferable that the projection is formed such that a sectional area thereof becomes the smaller as it goes away from the inside circumferential surface of the first sealing member the more.

The second projection portion includes one pair of projections formed along an outside circumferential surface of the first sealing member with a predetermined gap therebetween in an axis direction. In more detail, the second projection portion includes one pair of first projections formed along an outside circumferential surface of the first sealing member with a predetermined gap therebetween in an axis direction, and one pair of second projections projected from the first projections opposite to each other.

The second projection portion further includes one pair of extensions from edges of the first projections opposite to each other with slopes respectively, and it is preferable that the one pair of extensions have a gap therebetween which is smaller than a gap between the one pair of second projections.

The exhaust pipe includes a first exhaust pipe close to the dryer, and a second exhaust pipe far from the dryer having one side connected to the first exhaust pipe, and the sealing member further includes a second sealing member between the first exhaust pipe and the second exhaust pipe for preventing gas from leaking.

The second sealing member includes a first connection portion which surrounds the first exhaust pipe, a second connection portion which surrounds the second exhaust pipe, and a spacer portion between the first connection portion and the second connection portion for isolating the first exhaust pipe from the second exhaust pipe.

The sealing member further includes a slot formed at least in one of the first connection portion and the second connection portion for inserting at least one of the first connection portion and the second connection portion.

Moreover, preferably the first connection portion includes a receiving portion for receiving a fastening member which fastens the second sealing member close to the first exhaust pipe.

Preferably, at least one of the first connection portion, the second connection portion, and the spacer portion includes a chamfered portion.

Advantageous Effects

Because the sealing member of the exhaust pipe of the dryer of the present invention is mounted to surround the edge of the glass sheet or wall in which an opening is formed after being supported on the exhaust pipe of the dryer, the sealing member can secure the exhaust pipe of the dryer to the opening easily, and improve a fine view.

The sealing member designed to fit to various thicknesses of the wall or the glass sheet of the opening enables to use the sealing member to openings of various thicknesses.

Because the sealing member of an elastic material has inside portions supported on outside circumferential surfaces of the exhaust pipes of the dryer, and the outside portions engaged with the edge of the glass sheet or the wall, to attenuate vibration from the exhaust pipe of the dryer, the sealing member can reduce noise, and prevent the exhaust pipe or the opening suffering from damage.

The sealing of the connection portions of the exhaust pipes by the sealing members prevents the exhaust gas from leaking when a plurality of the exhaust pipes are connected.

BRIEF DESCRIPTION OF THE DRAWINGS

FIG. 1 illustrates a diagram showing a state a dryer in accordance with a preferred embodiment of the present invention is installed;

FIG. 2 illustrates a sectional perspective view of a first sealing member mounted to an exhaust pipe of the dryer in FIG. 1;

FIG. 3 illustrates a sectional perspective view of a first sealing member in accordance with another preferred embodiment of the present invention;

FIG. 4 illustrates a section of a first sealing member of an exhaust pipe of a dryer mounted to a 3t glass sheet in accordance with a preferred embodiment of the present invention;

FIG. 5 illustrates a section of a first sealing member of an exhaust pipe of a dryer mounted to a 5t glass sheet in accordance with a preferred embodiment of the present invention;

FIG. 6 illustrates a perspective view of a first exhaust pipe and a second exhaust pipe connected with a second sealing member;

FIG. 7 illustrates a section of a first exhaust pipe and a second exhaust pipe connected with a second sealing member; and FIG. 8 illustrates a section of a second sealing member.

BEST MODE FOR CARRYING OUT THE INVENTION

Reference will now be made in detail to the specific embodiments of the present invention, examples of which are illustrated in the accompanying drawings.

Referring to FIG. 1, the dryer in accordance with a preferred embodiment of the present invention includes a dryer body 10 having an exhaust duct 12 for discharging exhaust gas, and an exhaust pipe 20 connected to the exhaust duct 12 for guiding the exhaust gas to an outside of a room.

In order to extend the exhaust pipe 20 to the outside of the room, an opening h is formed in a wall 1 of a building or a glass sheet 2.

For securing the exhaust pipe 20 to the opening h, a first sealing member 100 is provided.

FIGS. 2 and 3 each illustrates a first sealing member 100 of an exhaust pipe of the dryer in accordance with a preferred embodiment of the present invention, and FIGS. 4 and 5 each illustrates the first sealing member 100 of an exhaust pipe of a dryer mounted to a 3t or 5t glass sheet in accordance with a preferred embodiment of the present invention.

Referring to FIGS. 2 to 5, the first sealing member is formed of an elastic material, such as nitrile-budadiene rubber (NBR), ethylene propylene diene monomer (EPDN), and so on, which are special synthetic rubber, in a ring shape with a first projection portion 110 from an inside circumferential surface and a second projection portion 120 from an outside circumferential surface.

In detail, the first projection portion 110 is projected from the inside circumferential surface of the first sealing member 100 and abuts with an outside circumferential surface of the exhaust pipe 20, to absorb vibration from the exhaust pipe 20. The first projection portion 110 includes at least two projections with a gap therebetween in a direction of thickness of the opening h, and it is preferable that the projections are formed to reduce an area where the projection abuts with the outside circumferential surface of the exhaust pipe 20. Though the projection in FIG. 2 has an inverted triangular section and the projection in FIG. 3 has a semicircular section, the shapes of the projection are not limited to those, but the shapes of the projection are viable as far as a sectional area of the shape becomes the smaller as it goes away from the inside circumferential surface of the first sealing member 100 the more.

The second projection portion 120 is projected from the outside circumferential surface of the first sealing member 100 such that the second projection portion 120 surrounds an edge of the wall 1 or the glass sheet 2 in which the opening h is formed. In detail, the second projection portion 120 includes one pair of first projections 122 projected with a first gap therebetween in an axis direction, and one pair of second projections 124 projected from the first projections 122 opposite to each other to form a second gap therebetween which is smaller than the first gap.

That is, while the first projections 122 are projected parallel to a direction in which the edge of the wall 1 or the glass sheet 2 is extended, the second projections 124 are projected perpendicular to the direction in which the edge of the wall 1 or the glass sheet 2 in which the opening h is formed is extended. According to this, the edge of the wall 1 or the glass sheet 2 which is comparatively thin is inserted between the second projections 124, and the edge of the wall 1 or the glass sheet 2 which is comparatively thick is inserted between the second projections 122 after the second projections 124 are cut away.

Taking that the glass sheet used for a building has a thickness of 3t or 5t (t=1 mm) into account, it is preferable that the gap between the first projections 122 is 5t, and the gap between the second projections 124 is 3t.

Moreover, the second projection portion 120 further includes one pair of extensions 126 from edges of the first projections 122 opposite to each other with slopes, respectively. Since the extensions 126 are extended with opposite direction slopes such that the extensions 126 come closer as the extensions go to edges thereof the more, so that the extensions 126 become to have close contact with the edge of the wall 1 or the glass sheet 2 if the edge of the wall 1 or the glass sheet 2 is inserted between the extensions 126, infiltration of rain or the like into the opening h is prevented.

In order to make the extensions 126 to have close contact with the wall 1 or the glass sheet 2 in which the opening is formed, it is preferable that the gap between the extensions 126 is smaller than the gap between the first projections 122 and the gap between the second projections 124.

A process for securing the exhaust pipe 20 of the dryer to the opening h with the first sealing member 100 will be described. As shown in FIGS. 4 and 5, after placing the exhaust pipe 20 in the first sealing member 100 such that the first projection portion 110 of the first sealing member is supported on the outside circumferential surface of the exhaust pipe 20, a portion of the exhaust pipe 20 is made to pass through the opening h in the wall 1 or the glass sheet 2, and the edge of the wall 1 or the glass sheet 2 in which the opening is formed is engaged with the second projection portion 120 of the first sealing member 100, thereby securing the exhaust pipe 20 of the dryer to the opening h.

In this instance, as shown in FIG. 4, if the opening h is in the 3t glass sheet, the edge of the glass sheet is engaged with the second projections 124 and the extensions 126, and as shown in FIG. 5, if the opening h is in the 5t glass sheet, after cutting off the second projections 124, the edge of the glass sheet is engaged with the first projections 122 and the extensions 126.

Once the first sealing member 100 is mounted thus, the first sealing member 100, not only attenuates vibration from the exhaust pipe 20, but also secures the exhaust pipe 20 to the opening h as well as seals between the exhaust pipe 20 and the opening h. In more detail, the first projection portion 110 serves to attenuate vibration transmitted through the exhaust pipe 20, the first projections 122 and the second projections 124 of the second projection portion 120 serves to secure the sealing member 120 to the wall 1 or the glass sheet 2 in which the opening is formed, and the extensions 126 of the second projection portion 120 serves to prevent infiltration of rain into the opening h along the first sealing member 100.

In the meantime, the exhaust pipe 20 of the dryer may have a plurality of pieces connected together.

FIGS. 1 and 6 each illustrates the first exhaust pipe P1 connected to the dryer, and the second exhaust pipe P2 connected to the first exhaust pipe P1 and extended to the outside of the room. However, a number of the pieces of the exhaust pipe 20 is not necessarily two, but may be three or more than three.

Provided between the first exhaust pipe P1 and the second exhaust pipe P2, there is a second sealing member 200 for firm connection of the first exhaust pipe P1 and the second exhaust pipe P2 as well as prevention of leakage of the exhaust gas through a connection portion of the first exhaust pipe P1 and the second exhaust pipe P2.

Referring to FIGS. 6 to 8, the second sealing member 200 includes a first connection portion 210 which surrounds the first exhaust pipe P1, a second connection portion 220 which surround the first connection portion 210 and the second exhaust pipe P2, and a spacer portion 230 between the first connection portion 210 and the second connection portion 220, for isolating the second connection pipe P2 from the first connection pipe P1. It is preferable that the second sealing member 200 is cylindrical and is formed of an elastic and electric insulating material.

In more detail, the first connection portion 210 is cylindrical and surrounds an outside circumferential surface of an edge of the first exhaust pipe P1, and it is preferable that the edge is chamfered so that the first exhaust pipe P1 can be inserted in the first connection 210 easily even if the first exhaust pipe P1 is press fit in the first connection portion 210.

The second connection portion 220 is also cylindrical to surround an edge of the second exhaust pipe P2 with a circular slot H for making an axial direction placing of the edge of the second exhaust pipe P2 therein, and preferably, also with chamfer at an edge thereof for easy press fit of the second exhaust pipe P2 into the second connection portion 220.

The placing in of the edge of the second exhaust pipe P2 in the slot H in the second connection portion 120 increases a contact area between the second exhaust pipe P2 and the second connection portion 220, to enhance a securing force between the second exhaust pipe P2 and the second connection portion 220. Of course, in order to enhance a securing force between the first exhaust pipe P1 and the first connection portion 210, a circular slot (not shown) may be formed at the first connection portion, similarly. However, the slot in the first connection portion 210 is liable to interfere an exhaust gas flow from the first exhaust pipe P1 to the second exhaust pipe P2, or to accumulate lint at the slot in the first connection portion 210.

In the meantime, it is preferable that the first connection portion 210 has a receiving portion 212 for receiving a fastening member 240 for firmer securing of the first connection portion 210 to the first exhaust pipe P1. The receiving portion 212 is one pair of projections at a predetermined distance in an axial direction from an outside circumferential surface of the first connection portion 210, and, for an example, the fastening member 240 may be a clamp. Though not shown, the receiving portion 212 may be provided to a second exhaust pipe P2 side.

In the meantime, it is preferable that the spacer portion 230 is an inward projection between the first connection portion 210 and the second connection portion 220, with a chamfer at an edge thereof on a side of the first connection portion 210 for not interfering the exhaust gas flow from the first connection portion 210 to the second connection portion 220.

Next, a process for connecting the first exhaust pipe P1 to the second exhaust pipe P2 with the second sealing member 200 will be described.

The edge of the first exhaust pipe P1 is press fit in the first connection portion 210, the fastening member 240 is mounted on the receiving portion 212 of the first connection portion 210, and the edge of the second exhaust pipe 220 is press fit in the slot H in the second connection portion 220. In this instance, the first exhaust pipe P1 and the second exhaust pipe P2 is spaced by the spacer portion 230.

The sealed connection between the first exhaust pipe P1 and the second exhaust pipe P2 with the second sealing member 200 enables to reduce noise because the second sealing member of an elastic material attenuates vibration from the dryer to the second exhaust pipe P2 through the first exhaust pipe P1. The close contact of the second sealing member both to the first exhaust pipe P1 and the second exhaust pipe P2 enables to prevent the exhaust gas from leaking. The space of the spacer portion 230 of the second sealing member 200 enables to prevent an accident caused by negligence of safety from taking place because the space prevents a lightning at the second exhaust pipe P2 of metal from transmission into the room.

INDUSTRIAL APPLICABILITY

Because the sealing member of the exhaust pipe of the dryer of the present invention is mounted to surround the edge of the glass sheet or wall in which an opening is formed after being supported on the exhaust pipe of the dryer, the sealing member can secure the exhaust pipe of the dryer to the opening easily, and improve a fine view.

The sealing member designed to fit to various thicknesses of the wall or the glass sheet of the opening enables to use the sealing member to openings of various thicknesses.

Because the sealing member of an elastic material has inside portions supported on outside circumferential surfaces of the exhaust pipes of the dryer, and the outside portions engaged with the edge of the glass sheet or the wall, to attenuate vibration from the exhaust pipe of the dryer, the sealing member can reduce noise, and prevent the exhaust pipe or the opening suffering from damage.

The sealing of the connection portions of the exhaust pipes by the sealing members prevents the exhaust gas from leaking when a plurality of the exhaust pipes are connected.

The invention claimed is:

1. A sealing member of an exhaust pipe of a dryer, the exhaust pipe being connected to the dryer for discharging gas from the dryer to an outside of a room, the sealing member comprising:
a first sealing member for securing the exhaust pipe to an opening in a glass sheet or a wall, wherein the first sealing member includes:
a first projection portion supported on an outside circumferential surface of the exhaust pipe for preventing vibration from transmitting from the exhaust pipe, and
a second projection portion formed to surround an edge of the glass sheet or the wall in which the opening is formed, wherein the second projection portion includes one pair of first projections formed along an outside circumferential surface of the first sealing member with a predetermined gap therebetween in an axis direction, and one pair of second projections projected from the first projections opposite to each other.

2. The sealing member as claimed in claim 1, wherein the first projection portion includes at least two projections formed along an inside circumferential surface of the first sealing member with a predetermined gap therebetween in a thickness direction of the opening.

3. The sealing member as claimed in claim 2, wherein the projection is formed such that a sectional area thereof becomes smaller as it goes away from the inside circumferential surface of the first sealing member.

4. The sealing member as claimed in claim 1, wherein the second projection portion further includes one pair of extensions from edges of the first projections opposite to each other with slopes, respectively.

5. The sealing member as claimed in claim 4, wherein the one pair of extensions have a gap therebetween which is smaller than a gap between the one pair of second projections.

6. The sealing member as claimed in claim 1, wherein the exhaust pipe includes:
a first exhaust pipe close to the dryer, and
a second exhaust pipe far from the dryer having one side connected to the first exhaust pipe, and
the sealing member further comprising a second sealing member between the first exhaust pipe and the second exhaust pipe for preventing gas from leaking.

7. The sealing member as claimed in claim 6, wherein the second sealing member includes:
a first connection portion which surrounds the first exhaust pipe,
a second connection portion which surrounds the second exhaust pipe, and
a spacer portion between the first connection portion and the second connection portion for isolating the first exhaust pipe from the second exhaust pipe.

8. The sealing member as claimed in claim 7, further comprising a slot formed at least in one of the first connection portion and the second connection portion for inserting at least one of the first exhaust pipe and the second exhaust pipe.

9. The sealing member as claimed in claim 7, wherein the first connection portion includes a receiving portion for receiving a fastening member which fastens the second sealing member close to the first exhaust pipe.

10. The sealing member as claimed in claim 7, wherein at least one of the first connection portion, the second connection portion, and the spacer portion includes a chamfered portion.

11. An exhaust pipe assembly of a dryer, the exhaust pipe being connected to the dryer for discharging gas from the dryer to an outside of a room, the assembly comprising:
a first sealing member for securing the exhaust pipe to an opening in a glass sheet or a wall, wherein the first sealing member includes a first projection portion supported on an outside circumferential surface of the exhaust pipe for preventing vibration from transmitting from the exhaust pipe, and
wherein the exhaust pipe includes:
a first exhaust pipe close to the dryer, and
a second exhaust pipe far from the dryer having one side connected to the first exhaust pipe, and
the sealing member further comprising a second sealing member between the first exhaust pipe and the second exhaust pipe for preventing gas from leaking,
wherein the second sealing member includes:
a first connection portion which surrounds the first exhaust pipe,
a second connection portion which surrounds the second exhaust pipe, and
a spacer portion between the first connection portion and the second connection portion for isolating the first exhaust pipe from the second exhaust pipe, and
further comprising a slot formed at least in one of the first connection portion and the second connection portion for inserting at least one of the first exhaust pipe and the second exhaust pipe.

12. An exhaust pipe assembly of a dryer, the exhaust pipe being connected to the dryer for discharging gas from the dryer to an outside of a room, the assembly comprising:
a first sealing member for securing the exhaust pipe to an opening in a glass sheet or a wall, wherein the first sealing member includes a first projection portion supported on an outside circumferential surface of the exhaust pipe for preventing vibration from transmitting from the exhaust pipe, and
wherein the exhaust pipe includes:
a first exhaust pipe close to the dryer, and
a second exhaust pipe far from the dryer having one side connected to the first exhaust pipe, and
the sealing member further comprising a second sealing member between the first exhaust pipe and the second exhaust pipe for preventing gas from leaking,
wherein the second sealing member includes:
a first connection portion which surrounds the first exhaust pipe,
a second connection portion which surrounds the second exhaust pipe, and
a spacer portion between the first connection portion and the second connection portion for isolating the first exhaust pipe from the second exhaust pipe, and
wherein at least one of the first connection portion, the second connection portion, and the spacer portion includes a chamfered portion.

* * * * *